(12) United States Patent
Wilke et al.

(10) Patent No.: US 7,919,181 B2
(45) Date of Patent: Apr. 5, 2011

(54) CONDUCTIVE, ORGANIC COATINGS WITH LOW LAYER THICKNESS AND GOOD PLASTICITY

(75) Inventors: Eva Wilke, Haan (DE); Manuela Göske-Krajnc, Hilden (DE); Reiner Wark, Wuppertal (DE); Guadalupe Sanchis Otero, Duesseldorf (DE); Stephan Müller, Monheim (DE); Marcel Roth, Duesseldorf (DE); Wolfgang Lorenz, Erkrath (DE); Karsten Hackbarth, Duesseldorf (DE); Andreas Kunz, Remscheid (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 99 days.

(21) Appl. No.: 12/496,092

(22) Filed: Jul. 1, 2009

(65) Prior Publication Data

US 2009/0324938 A1 Dec. 31, 2009

Related U.S. Application Data

(63) Continuation of application No. PCT/EP2007/063322, filed on Dec. 5, 2007.

(30) Foreign Application Priority Data

Jan. 4, 2007 (DE) .......................... 10 2007 001 653

(51) Int. Cl.
*B32B 27/38* (2006.01)
*B05D 3/00* (2006.01)
*B23K 9/00* (2006.01)

(52) U.S. Cl. ........ 428/336; 428/372; 428/341; 427/386; 219/137 R

(58) Field of Classification Search .................. 428/336, 428/372, 341; 427/386; 219/137 R
See application file for complete search history.

(56) References Cited

U.S. PATENT DOCUMENTS 6,312,812 B1  11/2001 Hauser et al.

FOREIGN PATENT DOCUMENTS

| DE | 3412234 C2 | 10/1988 |
|---|---|---|
| DE | 3640662 C2 | 1/1993 |
| EP | 0573015 A1 | 12/1993 |
| WO | 9924515 A1 | 5/1999 |
| WO | 0185860 A1 | 11/2001 |
| WO | 03089507 A1 | 10/2003 |
| WO | 03089529 A1 | 10/2003 |
| WO | 03089530 A1 | 10/2003 |
| WO | 2005123849 A1 | 12/2005 |
| WO | 2006084491 A1 | 8/2006 |
| WO | 2007101491 A2 | 9/2007 |

OTHER PUBLICATIONS

International Search Report dated Jul. 22, 2008, International Application PCT/EP2007/063322.

*Primary Examiner* — Thao T. Tran
(74) *Attorney, Agent, or Firm* — Mary K. Cameron

(57) ABSTRACT

The invention relates to a metal sheet, or a component made of a metallic material, comprising a layer system on the surface with at least the following layers: a) a conversion layer, comprising no more than 1 mg chromium per $m^2$, b) a layer of a cross-linked organic polymer system with a thickness in the range of 0.5 to 2.5 μm, comprising, in relation to the total mass of said layer, 2 to 25 wt. % of an electrically conductive pigment having a specific weight of 3 $g/cm^3$ maximum, however no more than 5 wt. % of the electrically conductive pigment having a specific weight of more than 3 $g/m^3$. A coating material and a coating method for the production of the layer b).

22 Claims, No Drawings

CONDUCTIVE, ORGANIC COATINGS WITH LOW LAYER THICKNESS AND GOOD PLASTICITY

This application is a continuation under 35 U.S.C. Sections 365(c) and 120 of International Application No. PCT/EP2007/063322, filed Dec. 5, 2007 and published on Jul. 10, 2008 as WO 2008/080746, which claims priority from German Patent Application No, 102007001653.2 filed Jan. 4, 2007, which are incorporated herein by reference in their entirety.

The present invention relates to conductive, weldable anticorrosive coatings for metal surfaces and to a method of coating metal surfaces with electrically conductive organic coatings. The layer thickness lies in the range from 0.5 to 2.5 μm. It further relates to a method of producing shaped components made from metal sheets thus coated.

A coating which may be understood to be electrically conductive for the purposes of the invention is one which, after curing, is weldable under joining technology conditions conventional in the automotive industry, preferably using the spot welding process. In addition, conductivity should be sufficient to ensure complete deposition of electrophoretic coating materials under the deposition conditions conventional for these coating materials.

In the metal-processing industry, in particular in motor vehicle construction, the metallic constituents of the products must be protected from corrosion. According to the conventional prior art, the sheets are initially coated with anticorrosive oils in the rolling mill and optionally coated with drawing greases prior to forming and stamping. In motor vehicle construction, appropriately shaped sheet metal parts are stamped out for the bodywork or bodywork parts and formed by the deep-drawing process using said drawing greases or oils, then generally joined together by welding and/or crimping and/or adhesive bonding and then subjected to elaborate cleaning. This is followed by anticorrosive surface pretreatments such as phosphating and/or chromating, whereupon a first coating layer is applied to the components by means of electrophoretic coating. As a rule, this first electrophoretic coating, in particular in the case of automotive bodies, is followed by the application of a plurality of further coating layers.

In the metal-processing industry such as for example in vehicle and domestic appliance construction there is a desire, for reasons of process simplification, to reduce expenditure on chemical anticorrosive treatment. This can be achieved by using raw material in the form of metal sheets or strips already bearing an anticorrosive layer.

There is therefore a need to find simpler production methods, in which sheet metal which has already been precoated may be formed, welded and electrophoretically coated in a tried and tested manner. There is thus a number of methods in which, after phosphating and/or chromating, an organic coating conductive to a greater or lesser degree is applied using the "coil coating process". These organic coatings are generally such that they have sufficient electrical conductivity not to impair welding processes typical in automotive manufacture, for example electrical spot welding processes. In addition, these coatings are intended to be coatable with conventional electrophoretic coating materials.

Recently, in the automotive industry in particular, it has become more common to use not only standard steel sheets but also steel sheets galvanized and/or alloy-galvanized using the most varied methods.

It is in principle known to coat sheet steel with organic coatings which are weldable and can be applied directly in the rolling mill by the "coil coating process".

DE-C-3412234 accordingly describes a conductive and weldable anticorrosive primer for electrolytically thin-galvanized, phosphated or chromated and formable sheet steel. This anticorrosive primer consists of a mixture of more than 60% zinc, aluminum, graphite and/or molybdenum disulfide and a further anticorrosive pigment and 33 to 35% of an organic binder together with approx. 2% of a dispersion auxiliary or catalyst. Polyester resins and/or epoxy resins and the derivatives thereof are suggested as the organic binder. It is assumed that this technology forms the basis of the coating composition known in the industry by the name of "Bonazinc 2000".

According to the teaching of DE-C-3412234, the organic binder may consist of polyester resins and/or epoxy resins and derivatives thereof. An epoxy/phenyl precondensate, an epoxy ester and linear, oil-free terephthalic acid based copolyesters are specifically mentioned.

EP-A-573015 describes organically-coated composite sheet steel consisting of a surface coated on one or both sides with zinc or a zinc alloy, which surface is provided with a chromate film and, thereon, an organic coating having a layer thickness of 0.1 to 5 μm. The organic coating is formed from a primer composition consisting of an organic solvent, an epoxy resin having a molecular weight of between 500 and 10000, an aromatic polyamine and a phenol or cresol compound as accelerator. The primer composition furthermore contains a polyisocyanate and colloidal silicic acid. According to the teaching of this document, the organic coating is preferably applied in a dry film layer thickness of 0.6 to 1.6 μm as layers thinner than 0.1 μm are too thin to provide corrosion protection. Layer thicknesses of above 5 μm, however, impair weldability.

Likewise, DE-A-3640662 describes surface treated sheet steel comprising sheet steel coated with zinc or a zinc alloy, a chromate film formed on the surface of the sheet steel and a layer of a resin composition formed on the chromate film. This resin composition consists of a basic resin, which is produced by reacting an epoxy resin with amines, together with a polyisocyanate compound. This film too may only be applied in dry film thicknesses of less than about 3.5 μm as weldability is severely reduced at greater layer thicknesses.

WO 99/24515 discloses a conductive and weldable anticorrosive composition for coating metal surfaces, which contains
a) 10 to 40 wt. % of an organic binder containing
   aa) at least one epoxy resin
   ab) at least one curing agent selected from guanidine, substituted guanidines, substituted ureas, cyclic tertiary amines and mixtures thereof
   ac) at least one blocked polyurethane resin
b) 0 to 15 wt. % of an anticorrosive pigment based on silicate
c) 40 to 70 wt. % of pulverulent zinc, aluminum, graphite and/or molybdenum sulfide, carbon black, iron phosphide
d) 0 to 30 wt. % of a solvent.

WO 01/85860 relates to a conductive and weldable anticorrosive composition for coating metal surfaces wherein, relative to the total composition, it contains
a) 5 to 40 wt. % of an organic binder containing
   aa) at least one epoxy resin
   ab) at least one curing agent selected from cyanoguanidine, benzoguanamine and plasticized urea resin
   ac) at least one amine adduct selected from polyoxyalkylenetriamine and epoxy resin/amine adducts
b) 0 to 15 wt. % of an anticorrosive pigment
c) 40 to 70 wt. % of a conductive pigment, selected from pulverulent zinc, aluminum, graphite, molybdenum sulfide, carbon black and iron phosphide
d) 0 to 45 wt. % of a solvent
and if desired up to 50 wt. % of further active or auxiliary substances, the proportions of the components adding up to 100 wt. %.

WO 03/089529 describes a mixture for applying to a substrate a polymeric, corrosion-resistant, electrically conductive or semiconductive coating in particular only up to 6 μm thick and formable with low wear, the mixture containing A) a content of electrically conductive and/or semiconductive elements/compounds selected from the group comprising a) electrically conductive and/or semiconductive particles with a particle size distribution with a $d_{80}$ passage value of <6 μm, b) electrically conductive and/or semiconductive polymeric compounds and c) electrically conductive and/or semiconductive amine- and/or ammonium-containing compounds and B) at least one binder optionally including reactive diluent(s) and C) in each case at least one crosslinking agent and/or at least one photoinitiator and D) optionally also in each case at least one component selected from d) post crosslinking compounds, e) additives, f) anticorrosive pigments, g) corrosion inhibitors present not in particle form and optionally E) organic solvent and/or water, the total of the percentages by weight of all the conductive and/or semiconductive elements/compounds A) amounting to 0.5 to 70 wt. % and the content of particles a) amounting to 0 to 60 wt. %.

Similarly, WO 03/089507 describes a mixture for applying to a substrate a polymeric, corrosion-resistant, electrically conductive coating formable with low wear, the mixture possibly containing, in addition to at least one substance A in the form of electrically conductive hard particles, at least one substance B in the form of very soft or soft, inorganic, sliding, electrically conductive or semiconductive particles and/or at least one substance C in the form of metallic, soft or hard, electrically conductive or semiconductive particles and/or carbon black and optionally further constituents such as for example an anticorrosive pigment D, the total of the percentages by weight of water-insoluble or sparingly water soluble pigment content making Σ(A+B+C) and the size of the electrically conductive, hard particles A amounting to less than 10 μm relative to the particle size passage value d99.

Finally WO 03/089530 describes a paint-like mixture containing resin and inorganic particles for applying to a substrate a polymeric, corrosion-resistant electrically conductive coating formable with low wear, the mixture comprising at least 10 wt. % of electrically conductive particles having an electrical conductivity better than that of zinc particles and having a Mohs' hardness greater than 4 relative to the solids contents of the mixture and these electrically conductive particles comprising a particle size distribution in which 3 to 22 vol. % of the electrically conductive particles, measured with a Mastersizer 2000 with a Hydro 2000S measuring head made by Malvern Instruments, are larger in a volume representation than the average layer thickness of the dried and optionally also hardened coating determined using scanning electron micrographs.

Despite the extensive prior art, there is still a need for further improvement to known weldable anticorrosive coatings. On the one hand, this relates to attempts to save materials and reduce weight, which makes it desirable to achieve the lowest possible layer thickness. On the other hand, despite the lowest possible layer thickness, sufficient corrosion protection should be achieved. Furthermore, the weldable coatings comprise good surface slip properties, so that the coated metal sheets may be formed as far as possible without the application of oil. In this way it is possible on the one hand to save on forming oil and on the other hand to simplify the cleaning procedure required prior to the application of further coatings thereon. In this way, material consumption throughout the entire production chain may be further reduced. The object of the present invention is to provide coated metal substrates and a coating method which bring about the stated advantages.

The present invention therefore relates in a first aspect to a sheet or component of a metallic material, which bears on its surface a multilayer system containing at least the following layers:

a) a conversion layer, which contains no more than 1 mg of chromium per $m^2$, b) a layer of a crosslinked organic polymer system with a thickness in the range from 0.5 to 2.5 μm, which, relative to the total mass of this layer, contains 2 to 25 wt. % of an electrically conductive pigment with a relative density of at most 3 $g/cm^3$, but no more than 5 wt. % of electrically conductive pigment with a relative density of more than 3 $g/m^3$.

As is conventional in automotive construction, the metallic material may be selected from aluminum or an aluminum alloy, zinc or a zinc alloy, steel or steel coated with zinc, aluminum or alloys of zinc or aluminum.

The conversion layer a), which contains no more than 1 $mg/m^2$ of chromium, may be brought about using phosphating processes or chromium-free conversion processes known in the prior art based on acidic solutions of complex fluorides of boron, silicon and in particular titanium zirconium and/or hafnium. In the latter case a positive effect may be had on corrosion protection and on the adhesion of the subsequently applied layer b) if organic resins such as for example polyacrylates or amino-substituted polyvinylphenols are added to the conversion solution for producing the conversion layer a). Preferably the conversion layer a) contains less than 0.1 mg of chromium per $m^2$ and is in particular preferably chromium-free. In this way, the future requirement for chromium-free coated automotive bodies is taken into account.

So that a sheet or component bearing the stated layers a) and b) is easy to form and wears the forming tools only slightly, it is advisable for the layer b) to exhibit a Mohs' hardness of no more than 4.

The organic polymer system of the layer b) may be of variable composition. For example, the layer b) may contain as crosslinked organic polymer system a polymer system based on a urethane resin. Preferably the layer contains such a urethane resin, which is obtainable by reacting an aliphatic polyisocyanate with polyesters containing hydroxyl groups, polyethers containing hydroxyl groups or poly(meth)acrylates containing hydroxyl groups. The polyisocyanate component which crosslinks to yield the polyurethane resin may be in particular an aliphatic polyisocyanate based on an HDI trimer. Furthermore, mixed aliphatic/aromatic polyisocyanates based for example on TDI and HMDI are suitable. Polyurethane resins which have already been preformed may also be used. Such polyisocyanates or polyurethane resins are commercially obtainable products. Examples which may be mentioned are: Desmotherm® 2170, Vesticoat® UB 909, Desmodur® BL 3475, Desmodur® HLBA, Desmodur® N 3390, Desmodur® N 3790, Desmodur® N 75 and Tolonate® HDT-LV 2.

The polyesters containing hydroxyl groups or the poly (meth)acrylates containing hydroxyl groups usable as crosslinking component for the polyisocyanate or polyurethane are likewise commercially obtainable under various trade names. Examples which may be mentioned are: Desmophen® 1100, Desmophen® 370, Desmophen® A665 BA.

In a further embodiment, the layer b) contains as crosslinked organic polymer system a polymer system based on an epoxy resin. This may be obtained for example by reacting a polyepoxide or epoxy resin prepolymer with residual epoxy groups with a curing agent or plurality of curing agents selected from the group comprising: melamine/formaldehyde resins, polyesters containing hydroxyl groups, polyethers containing hydroxyl groups, poly(meth)acrylates containing hydroxyl groups.

The epoxy component may be selected for example from the following commercial raw materials:
Beckopox® EM 441, Beckopox® EP 309, Beckopox® EP 401, Araldite® GT 6099 and Epikote® 109.

The polyesters containing hydroxyl groups or poly(meth) acrylates containing hydroxyl groups usable as curing agents may be selected from the raw materials already mentioned above. The products Desmodur® BL 3175 and Desmodur® BL 3370 may for example be used as HDI-based blocked aliphatic isocyanates.

It is particularly preferable for the purposes of the present invention for the layer b) to contain as the crosslinked organic polymer system both a polymer system based on a urethane resin and a polymer system based on an epoxy resin. This leads to an optimized profile of properties with regard to corrosion protection, adhesion of the coating to the substrate, formability and adhesion of a coating subsequently to be applied to layer b).

In this case, those urethane resins and epoxy resins may be present which have been described above. The invention is then characterized in that the urethane resin may be obtained by reacting a polyisocyanate with polyesters containing hydroxyl groups, polyethers containing hydroxyl groups or poly(meth)acrylates containing hydroxyl groups and in that the epoxy resin may be obtained by reacting a polyepoxide with a curing agent or a plurality of curing agents selected from the group comprising: melamine/formaldehyde resins, polyesters containing hydroxyl groups, polyethers containing hydroxyl groups, poly(meth)acrylates containing hydroxyl groups.

As a further embodiment it is particularly preferable for the layer b) to contain a polymer system which constitutes a reaction product of an epoxy resin present as a polyether containing hydroxyl groups based on a bisphenol/epichlorohydrin polycondensation product with an aliphatic polyisocyanate.

In this embodiment the epoxy resin present as a polyether containing hydroxyl groups comprises substantially no more free epoxy groups. Instead, its crosslinking reaction proceeds by way of the hydroxyl groups. In this respect, it is particularly preferable for the crosslinking to proceed in layer b) through reaction with an HDI-based aliphatic polyisocyanate. In this respect it is additionally preferable for further polyurethane resins to be present in layer b) in addition to this polymer system, said further polyurethane resins being formed by reacting polyisocyanates with polyesters containing hydroxyl groups and/or poly(meth)acrylates containing hydroxyl groups.

The layer b) may contain aluminum flakes, graphite and/or carbon black as the electrically conductive pigment. The use of graphite and/or carbon black is in this case preferred. Carbon black and in particular graphite not only bring about electrical conductivity of the layer b) but also contribute to this layer exhibiting the desired low Mohs' hardness of no more than 4 and being readily formable. The lubricant action of graphite in particular contributes to reduced wear of the forming tools. This action may be further promoted by additionally using pigments with lubricant action such as for example molybdenum sulfide. The layer b) may contain waxes and/or Teflon as further lubricants or forming aids.

The electrically conductive pigment with a relative density of at most 3 g/cm³ may be present in the form of small balls or aggregates of such balls. In this respect it is preferable for the balls or the aggregates of these balls in layer b) to have a diameter of less than 2 µm. Preferably, however, the electrically conductive pigments are present in the form of lamellae, whose thickness is preferably less than 2 µm.

It is additionally preferable for the layer b) additionally to contain corrosion inhibitors and/or anticorrosive pigments. Corrosion inhibitors and/or anticorrosive pigments may be used in this case which are known for this purpose from the prior art. Examples which may be mentioned are: magnesium oxide pigments, in particular in nanoscale form, finely divided and very finely divided barium sulfate or anticorrosive pigments based on calcium silicate.

The mechanical and chemical properties of the layer b) may furthermore be improved in that it contains silicic acids or silicon oxides. These may also be hydrophobized. Such products are obtainable for example under the name Aerosil®.

It is therefore preferable for the layer b) to contain, in addition to the essential components, one or more components selected from I. corrosion inhibitors and/or anticorrosive pigments, preferably in an amount of from 5 to 60, in particular in an amount of from 10 to 40 wt. %,
II. silicic acids or silicon oxides, preferably in an amount of from 0.5 to 5, in particular in an amount of from 1 to 3 wt. %,
III. lubricants or forming aids, preferably selected from waxes, molybdenum sulfide and Teflon, preferably in an amount of from 0.5 to 20, in particular in an amount of from 1 to 10 wt. % the amounts indicated in wt. % relating to the total mass of the layer b).

In layer b) the proportion of organic binder may be smaller than the proportion of inorganic pigments. In general, however, it is preferable for the layer b) to contain more organic binder than inorganic pigments. Preferably the ratio by weight of inorganic pigments to organic binder is in the range from 1:1 to 1:3, in particular in the range from 1:1.5 to 1:2.

In order to arrive at easy, low-wear formability of the metal parts provided with the layer b), such as in particular metal sheets, it is advantageous for a sheet provided on both sides with the multilayer system to exhibit a coefficient of friction µ of below 0.1 in a tribometer friction wear test without the additional application of oil with a contact pressure in the range from 300 to 700 daN. Such coated sheets may then be formed directly without the additional application of oil. In this way, forming oil may be saved and the necessary cleaning before the application of coatings thereon may be simplified. This is achieved in particular when the layer b) contains graphite as the electrically conductive pigment and both a polymer system based on a urethane resin and a polymer system based on an epoxide as the organic polymer system, as has been described above in greater detail. Furthermore a favorable effect is achieved if the layer b) contains around 0.2 to around 0.5 parts by weight of silicic acid (Aerosil®).

The present invention relates in a further aspect to a method of producing a sheet or component which comprises the above-described multilayer system consisting of a conversion layer a) and the conductive organic layer b). The present invention thus also provides a method of producing a sheet or component, wherein the sheet or component to be coated
i) is cleaned, if necessary,
ii) is brought into contact with a conversion solution, which produces the conversion layer, and thereafter, with or without intermediate rinsing,
iii) is brought into contact with a liquid treatment agent, which, after curing at a substrate temperature in the range from 120 to 260° C., produces the layer b).

Preferably, curing proceeds at a substrate temperature in the range from 150-170° C.

At least steps (ii) and (iii) are here carried out as strip treatment processes, the liquid treatment agent being applied in step (iii) in a quantity such that, after curing, the desired layer thickness in the range from 0.5 to 2.5 µm is obtained. Preferably, the layer b) is thus applied using the "coil coating process". In this process, moving metal strips are continuously coated. The coating composition may here be applied by various processes which are familiar in the prior art. For example, application rollers may be used, with which the desired wet film thickness may be directly established. Alternatively, the metal strip may be immersed in the coating composition or be sprayed with the coating composition, after which the desired wet film thickness is established with the assistance of squeegee rollers.

If metal strips are coated which have immediately previously been provided with a metal coating, for example of electrolytic or hot dip zinc or zinc alloy, the metal surfaces need not be cleaned before the conversion treatment (ii) is carried out. However, if the metal strips have already been stored and in particular provided with anticorrosive oils, a cleaning step is necessary before step (ii) is carried out.

After application of the liquid treatment agent in step (iii), the coated sheet is heated to the necessary drying or crosslinking temperature for the organic coating. The coated substrate may be heated to the necessary substrate temperature ("peak metal temperature"=PMT) in the range from 120 to 260° C., preferably in the range from 150 to 170° C., in a heated tunnel oven. The treatment agent may, however, also be adjusted to the appropriate drying or crosslinking temperature by infrared radiation, in particular by near infrared radiation.

As already explained above in connection with the coating provided, the conversion solution for use in step (ii) may be a layer-forming or non-layer-forming phosphating solution known in the prior art. Alternatively, an acidic treatment solution may be used which contains complex fluorides of silicon and in particular of titanium and/or zirconium as the layer-forming component. The conversion solution may furthermore contain organic polymers such as for example polyacrylates or amino-substituted polyvinyiphenol derivatives. Adding nanoscale silicic acid or nanoscale alumina to the conversion solution in step (ii) may give rise to further improved anticorrosive and adhesion properties. "Nanoscale" particles are here taken to mean those which on average have a particle diameter of less than 1000 nm, in particular of less than 500 nm.

The preferred structure of the organic polymer system in the conductive organic layer b) has been described above. It is self-evident on this basis that the liquid treatment agent used in treatment step (iii) contains the corresponding reactive polymer components. Reference is made in this connection to the embodiments mentioned further above.

It is particularly preferred in this case for the liquid treatment agent in step (iii) to contain at least one polyisocyanate and at least one reaction component selected from polyesters containing hydroxyl groups, polyethers containing hydroxyl groups or poly(meth)acrylates containing hydroxyl groups. It is moreover particularly preferable for the liquid treatment agent in step (iii) to contain at least the following constituents: a polyepoxide with residual epoxy groups and one or more curing agents selected from the group comprising: melamine/formaldehyde resins, polyesters containing hydroxyl groups, polyethers containing hydroxyl groups, poly(meth)acrylates containing hydroxyl groups.

Preferably, this treatment agent in each case contains at least one of the following crosslinkable resin components A) to D):

A) non-blocked aliphatic polyisocyanate,
B) blocked aliphatic polyisocyanate,
C) epoxy resin present as the polyether containing hydroxyl groups, based on a bisphenol/epichlorohydrin polycondensation product,
D) at least one reaction component selected from polyesters containing hydroxyl groups and poly(meth)acrylates containing hydroxyl groups.

The aliphatic polyisocyanates are preferably based on HDI, in particular on HDI trimer. The conventional polyisocyanate blocking agents may be used as blocking agents in the blocked aliphatic polyisocyanate B). Examples which may be mentioned are: butanone oxime, dimethylpyrazole, malonic ester, diisopropylamine/malonic ester, diisopropylamine/triazole and C-caprolactam. A combination of malonic ester and diiospropylamine is preferably used as blocking agents.

Preferably, the above-stated components are present in the treatment agent in the following proportions relative to the total, solvent-containing coating agent:

A) non-blocked aliphatic polyisocyanate: 5 to 20 wt. %, preferably 6 to 12 wt. %,
B) blocked aliphatic polyisocyanate: 2 to 20 wt. %, preferably 3 to 10 wt. %,
C) epoxy resin present as polyether containing hydroxyl groups: 2 to 10 wt. %, preferably 2.4 to 6 wt. %,
D) polyester containing hydroxyl groups and/or poly(meth)acrylate containing hydroxyl groups: altogether 10 to 30 wt. %, preferably 12 to 23 wt. %.

The organic polymer components, which, after curing, form the organic polymer system of the layer b), are present in the raw materials as a rule as a solution in an organic solvent. Therefore, the coating agent for use in step (iii) likewise contains organic solvents. These are desirable, in order, despite the additional presence of the electrically conductive pigment such as for example graphite and optionally further pigments such as in particular anticorrosive pigments, to establish a viscosity which enables application of the coating agent to the substrate using the coil coating process. If necessary, solvent may additionally be added. In general, the coating agent to be applied in step (iii) contains 25 to 60 wt. %, in particular 35 to 55 wt. % solvent. The chemical nature of the solvents is generally predetermined by the choice of raw materials, which contain the corresponding solvent. Examples of solvents which may be present are: cyclohexanone, diacetone alcohol, diethylene glycol monobutyl ether acetate, diethylene glycol, propylene glycol methyl ether, propylene glycol n-butyl ether, methoxypropyl acetate, succinic acid dimethyl ester, glutaric acid dimethyl ester and/or adipic acid dimethyl ester.

It goes without saying that the liquid treatment agent to be applied in step (iii) contains those components in corresponding quantity ratios which are essentially or optionally present as components in the above-described layer b). They are present in the liquid treatment agent in the corresponding quantity ratio, but in smaller absolute quantities than in the finished layer b) due to the presence of the organic solvent. It is therefore preferred in the method according to the invention for the liquid treatment agent in step (iii) to contain, relative to the total mass of the liquid treatment agent, 1 to 12 wt. % of an electrically conductive pigment with a relative density of at most 3 g/cm$^3$, but no more than 3 wt. % of electrically conductive pigment with a relative density of more than 3 g/m$^3$.

It is furthermore preferable for the liquid treatment agent in step (iii) additionally to contain, relative to the total mass of the liquid treatment agent, one or more components selected from I. corrosion inhibitors and/or anticorrosive pigments, preferably in an amount of from 2.5 to 30, in particular in an amount of from 5 to 20 wt. %,
II. silicic acids or silicon oxides, preferably in an amount of from 0.2 to 2.5, in particular in an amount of from 0.5 to 1.5 wt. %,
III. lubricants or forming aids, preferably selected from waxes, molybdenum sulfide and Teflon, preferably in an amount of from 0.5 to 20, in particular in an amount of from 1 to 10 wt. %.

The liquid treatment agent used in step (iii) is preferably composed such that it contains, relative to the total mass of the liquid treatment agent, 25 to 60 wt. %, preferably 35 to 55 wt. % of organic solvent and 20 to 45 wt. % of resin components. The rest up to 100 wt. % is divided between the above-stated further essential and optional components. The sum of resin component and organic solvent may, however, amount to at most 99 wt. %, since the agent should contain at least 1 wt. % conductive pigment. Since the agent is preferably intended to contain still further solid components such as in particular anticorrosive pigments, the sum of resin components and solvent is preferably no greater than 96 wt. % and in particular no greater than 85 wt. %.

As has already been described above, a sheet coated according to the invention may be formed without the use of forming oil. In addition to the saving in materials due to the low layer thicknesses, these savings in forming oil are a significant advantage of the present invention. Accordingly, the present invention relates in a further aspect to a method of producing shaped components made from sheet metal, wherein a sheet coated as described above is formed without the application of oil and the formed sheet is joined together with other sheets by arc welding.

The sheets coated according to the invention are preferably used in the vehicle construction and domestic appliance industries. It is conventional in these cases, after production of the corresponding objects from the sheet coated according to the invention, to apply one or more further coating layers to the layer b). This takes place in vehicle construction conventionally through cathodic electrophoretic coating, which is possible due to the electrical conductivity of the coating. This is followed by the further coating steps typical of the automotive industry. For simpler corrosion protection requirements such as for example in the domestic appliance industry a powder coating may be applied to the layer b) as a top coat.

The invention is explained in greater detail below by a number of practical examples.

EXAMPLES a) Pretreatment

A commercial pretreatment solution based on phosphoric acid, manganese phosphate, $H_2TiF_6$ and aminomethyl-substituted polyvinylphenol (Granodine® 1455 made by the applicant) is applied to a galvanized metal sheet cleaned with alkaline cleaners (e.g. Ridoline® C 72, Ridoline® 1340; immersion or spray cleaning products made by the applicant) and spread over the metal surface with a spin coater or a chemcoater. Drying then takes place at 80° C.

b) Instructions for Producing and Applying the Anticorrosive Composition

The organic binders are placed at room temperature in a dissolver vessel and the anticorrosive pigment (mixture) is finely dispersed, which may take 10 to 60 minutes. Then the conductive pigment is introduced and distributed by slow stirring until wetting is complete. This may likewise take 10 to 60 minutes. Solvent and further additives are then optionally mixed in.

The anticorrosive composition is applied with a coating knife or a roll coater to the pretreated sheets and cured by heating in a drying cabinet to the substrate temperature indicated in the tables.

Test Method:

Corrosion Protection Test [to DIN 50021]:

Three edges and the back of the coated test sheet are masked with adhesive tape. A fresh cut edge is produced at one long side. The sheet is additionally scored. Then the test sheet is introduced into the salt spray test apparatus. After specific intervals, the degree of rust at the score and the edge and on the sheet surface is assessed. The tables indicate the number of hours after which red rust is visible on the test sheets.

MEK Resistance:

A 1 kg weight is wrapped in cotton wool impregnated with methyl ethyl ketone (MEK) and passed over the test surface coated with the anticorrosive composition. The number of to-and-fro cycles needed to remove the coating to the degree where the metallic substrate becomes visible is counted and is taken as a measure of solvent resistance.

T-Bend Test: According to ECCA Test Method T7 [1996]: "Resistance to Cracking on Bending"

The coated sheet is bent by 1800 using a press brake. An adhesive tape (Tesafilm 4104) is stuck to the edge and torn off with a jerk. Cracking at the formed edge is assessed to DIN 53230.

Reverse Impact Test: According to ECCA Test Method T5 [1985]: "Resistance Against Cracking During Rapid Forming"

The sheet coated on one side is deformed using a ball impact tester (weight: 2 kg; height: 1 m). An adhesive tape (Tesafilm 4104) is stuck to the resultant bulge and torn off with a jerk. The amount of coating peeled off with the adhesive tape is assessed visually using an assessment scale of 1 to 5. The following definitions apply: 1: no coating peeled off; 5: coating largely peeled off.

Alkali Resistance:

The sheet coated on one side is deformed as for the reverse impact test. The deformed part is immersed for 10 minutes in a 70-80° C. alkaline cleaning solution (Ridoline® C72, 1%, pH approx. 13). An adhesive tape (Tesafilm 4104) is stuck to the resultant bulge and torn off with a jerk. The amount of coating peeled off with the adhesive tape is assessed visually using an assessment scale of 1 to 5. The following definitions apply: 1: no coating peeled off; 5: coating largely peeled off.

Welding Tests:

Using an automatic welder made by Dalex (PMS 11-4 model), arc welding tests were performed under conditions typical of the automotive industry. Weld points were determined within the DaimlerChrysler specification DBL 4062/4066. This means that the sheets coated with the anticorrosive agent according to the invention may be electric arc welded under practical conditions with a sufficient electrode service life.

Friction Wear Testing:

A test sheet comprising the described coating on both sides is introduced between two pressing jaws, which press on the sheet with a force Fs. The sheet is pulled upwards with a force Ft. The coefficient of friction $\mu$ is defined as $Ft/(2\,Fs)$.

The pressing jaws each have an area of 1 $cm^2$ and are pressed with a force of between 0 and 2000 daN, the level of contact pressure typically being increased by 10 daN per second. The tensile force Ft varies between 0 and 100 daN, the test sheet being pulled at a rate of 1.5 to 200 mm per second through the pressing jaws.

In the case of coatings according to the invention without the additional application of oil, the coefficient of friction $\mu$ is below 0.1 after an initial maximum and as a rule in the range between 0.06 and 0.9, measured up to a maximum contact force Fs of 800 daN. When the same test is performed on a coating not according to the invention but rather according to the prior art (Granocoat®) ZE, Henkel KGaA, the coefficient of friction $\mu$ does not fall below a value of 0.1. This is the case even when this comparison coating is covered with 0.5 $g/m^2$ of forming oil.

In practice, these results mean that sheets provided with the coating according to the invention may be formed without the additional application of oil, without on the one hand being damaged nor on the other hand resulting in excessive wear of the forming tools.

Details about the composition of anticorrosive compositions according to the invention and test results are to be found in the following tables.

TABLE 1

| Component no. | Example 1 | Example 2 | Example 3 | Example 4 | Example 5 | Example 6 |
|---|---|---|---|---|---|---|
| 1 | | | | 24.00 | | 24.00 |
| 4 | | 14.12 | 13.28 | | 14.12 | |
| 5 | | 13.79 | 12.97 | | 13.79 | |
| 6 | | 6.51 | 6.12 | | 6.51 | |
| 7 | | 1.89 | 1.80 | | 1.89 | |
| 8 | | | | 12.00 | | 12.00 |
| 12 | 3.60 | | | | | |
| 13 | 7.74 | | | | | |
| 18 | 21.06 | | | | | |
| 25 | 18.25 | | | | | |
| 27 | | 13.10 | 11.30 | 25.30 | 13.10 | 25.30 |
| 29 | 18.25 | | | | | |
| 35 | 12.00 | 12.00 | 12.00 | 12.00 | | |
| 36 | | | | | 12.00 | 12.00 |
| 41 | 0.5 | | | | | |
| 44 | 6.00 | | 6.00 | 6.00 | | 6.00 |
| 47 | | | 0.10 | 0.10 | | 0.10 |
| 48 | | 0.26 | 0.26 | 0.26 | 0.26 | 0.26 |
| Solvent from raw materials | 12.60 | 38.33 | 36.17 | 20.34 | 38.33 | 20.34 |
| Total | 100.00 | 100.00 | 100.00 | 100.00 | 100.00 | 100.00 |

TABLE 2

| | Formulation data | | | | | |
|---|---|---|---|---|---|---|
| | 1 | 2 | 3 | 4 | 5 | 6 |
| Solids content | 50.90 | 48.57 | 52.36 | 54.36 | 48.57 | 54.36 |
| P/B ratio | 0.57 | 0.33 | 0.52 | 0.50 | 0.33 | 0.50 |
| Binder content, solid | 32.40 | 36.57 | 34.53 | 36.36 | 36.57 | 36.36 |
| Anticorrosive pigment | 12.00 | 12.00 | 12.00 | 12.00 | 12.00 | 12.00 |

TABLE 2-continued

| | Formulation data | | | | | |
|---|---|---|---|---|---|---|
| | 1 | 2 | 3 | 4 | 5 | 6 |
| Pigment content | 18.50 | 12.00 | 18.00 | 18.00 | 12.00 | 18.00 |
| Solvent | 49.10 | 51.43 | 47.47 | 45.64 | 51.43 | 45.64 |

The following abbreviations apply:
PMT: "Peak Metal Temperature": Highest substrate temperature achieved during curing of the coating, MEK: MEK resistance as per above description.

TABLE 3

| Characteristics | 1 | 2 | 3 | 4 | 5 | 6 |
|---|---|---|---|---|---|---|
| PMT (° C.) | 150 | 250 | 250 | 250 | 250 | 250 |
| Pot life | 24 h | >1 week | >1 week | >1 week | >1 week | >1 week |
| T-bend | 0-1 | 2-3 | 0-1 | 0.1 | 1 | 1 |
| Reverse impact | 0 | 0 | 0 | 0-1 | 0-1 | 0-1 |
| MEK | 5 | 14 | 13 | >100 | 60 | >100 |
| Alkali resistance | — | — | — | — | 0 | 0 |
| Corrosion protection (h) | 1000 | 750 | >500 | 700 | 250 | 350 |

TABLE 4

| Component no. | Example 7 | Example 8 | Example 9 | Example 10 | Example 11 | Example 12 | Example 13 |
|---|---|---|---|---|---|---|---|
| 4 | 9.83 | | | | | | |
| 5 | 9.61 | | | | | | |
| 6 | 4.53 | | | | | | |
| 7 | 1.35 | | | | | | |
| 9 | | | 12.57 | 10.08 | | | |
| 10 | | | | | 11.63 | | |
| 11 | | | 5.34 | | | | |
| 12 | | 7.74 | | | | 7.03 | 10.67 |
| 13 | | 3.60 | | | | 3.28 | 4.97 |
| 15 | | | 10.45 | | | | |
| 16 | | | | 12.00 | 12.00 | | |
| 17 | | 22.68 | | | | | |
| 18 | | | | | | 19.14 | 29.05 |
| 25 | | | | | | 42.20 | |
| 26 | | | | 31.60 | 30.90 | | |
| 27 | 19.45 | | | | | | |
| 29 | | 36.80 | 44.50 | 24.00 | 23.60 | | 12.41 |

TABLE 4-continued

| Component no. | Example 7 | Example 8 | Example 9 | Example 10 | Example 11 | Example 12 | Example 13 |
|---|---|---|---|---|---|---|---|
| 35 | 24.00 | 12.00 | 12.00 | 12.00 | 12.00 | 10.90 | 16.55 |
| 41 | | | | | | | 0.69 |
| 44 | 4.50 | 6.00 | 6.00 | 6.00 | 6.00 | | |
| 45 | | | | | | 6.00 | 8.28 |
| 47 | 0.10 | 0.10 | 0.10 | | | | |
| Solvent from raw materials | 26.63 | 11.08 | 9.04 | 4.32 | 3.87 | 11.45 | 17.38 |
| Total | 100.00 | 100.00 | 100.00 | 100.00 | 100.00 | 100.00 | 100.00 |

TABLE 5

| | Formulation data | | | | | | |
|---|---|---|---|---|---|---|---|
| | 7 | 8 | 9 | 10 | 11 | 12 | 13 |
| Solids content | 53.92 | 52.12 | 46.46 | 40.08 | 41.63 | 46.35 | 70.21 |
| P/B ratio | 1.12 | 0.53 | 0.63 | 0.82 | 0.76 | 0.57 | 0.57 |
| Binder content, solid | 25.42 | 34.12 | 28.46 | 22.08 | 23.63 | 29.45 | 44.69 |
| Anticorrosive pigment | 24.00 | 12.00 | 12.00 | 12.00 | 12.00 | 10.90 | 16.55 |
| Pigment content | 28.50 | 18.00 | 18.00 | 18.00 | 18.00 | 16.90 | 25.52 |
| Solvent | 46.08 | 47.88 | 53.54 | 59.92 | 58.37 | 53.65 | 29.79 |

TABLE 8

| | Formulation data | | | | | | |
|---|---|---|---|---|---|---|---|
| | 13 | 14 | 15 | 16 | 17 | 18 | 19 |
| Solids content | 62.06 | 53.38 | 58.21 | 46.66 | 50.51 | 50.71 | 49.42 |
| P/B ratio | 0.41 | 0.37 | 0.65 | 0.79 | 0.61 | 0.53 | 0.49 |
| Binder content, solid | 44.06 | 38.98 | 35.21 | 26.06 | 31.40 | 33.06 | 33.10 |
| Anticorrosive pigment | 12.00 | 14.40 | 13.00 | 13.73 | 12.74 | 11.77 | 10.88 |
| Pigment content | 18.00 | 14.40 | 23.00 | 20.60 | 19.11 | 17.65 | 16.32 |
| Solvent | 37.94 | 46.62 | 41.79 | 53.34 | 49.49 | 49.29 | 50.58 |

TABLE 6

| Characteristics | 7 | 8 | 9 | 10 | 11 | 12 | 13 |
|---|---|---|---|---|---|---|---|
| PMT (° C.) | 250 | 150 | 150 | 150 | 150 | 150 | 150 |
| Pot life | >1 week | 6 h | >1 week | >1 week | >1 week | 16-20 | 10-20 |
| T-bend | 1 | 1 | 2 | 2 | 1-2 | 0 | 0 |
| Reverse impact | 0-1 | 0 | 1 | 2 | 1 | 0 | 0 |
| MEK | 12 | 13 | 5 | 3 | 3 | 1 | 2 |
| Corrosion protection (h) | <1000 | 1000 | 1000 | <500 | <500 | <1000 | 900 |

TABLE 7

| Comp. No. | Example 13 | Example 14 | Example 15 | Example 16 | Example 17 | Example 18 | Example 19 |
|---|---|---|---|---|---|---|---|
| 1 | 6.78 | | | | | | |
| 10 | 13.88 | | | | | | |
| 11 | | | | | | | 12.44 |
| 12 | | 9.27 | 8.37 | | | | |
| 13 | | 4.32 | 3.92 | | | | |
| 14 | | | | | | 10.72 | |
| 17 | | | | 25.95 | 24.08 | 22.24 | 20.57 |
| 18 | | 25.29 | 22.82 | | | | |
| 19 | 23.40 | | | | | | |
| 20 | | | | | 7.21 | | |
| 27 | 10.30 | | | | | | |
| 28 | 18.50 | | | | | | |
| 29 | | 31.40 | 28.05 | 42.11 | 39.07 | 36.09 | 33.38 |
| 35 | 12.00 | 14.40 | 13.00 | 13.73 | 12.74 | 11.77 | 10.88 |
| 44 | 6.00 | | | 6.87 | 6.37 | 5.88 | 5.44 |
| 46 | | | 10.00 | | | | |
| 47 | | 0.10 | 0.10 | 0.11 | 0.11 | 0.10 | 0.09 |
| Solvent from raw materials | 9.14 | 15.22 | 13.74 | 11.23 | 10.42 | 13.20 | 17.20 |
| Total | 100.00 | 100.00 | 100.00 | 100.00 | 100.00 | 100.00 | 100.00 |

TABLE 9

| Characteristics | 13 | 14 | 15 | 16 | 17 | 18 | 19 |
|---|---|---|---|---|---|---|---|
| PMT (° C.) | 150 | 150 | 150 | 150 | 150 | 150 | 150 |
| Pot life | >1 week | <12 | <12 | <16 | <17 | <20 | <7 |
| T-bend | 2 | 0 | 0 | 2 | 0 | — | — |
| Reverse impact | 1-2 | 0 | 0 | 1 | 0-1 | — | — |
| MEK | 3 | 0 | 5 | 2 | 2 | — | — |
| Alkali resistance | — | — | — | — | — | — | — |
| Corrosion protection | 750 | 1000 | >1000 | — | — | <700 | <700 |

TABLE 10

| Component no. | Example 19 | Example 20 | Example 21 | Example 22 | Example 23 | Example 24 | Example 25 |
|---|---|---|---|---|---|---|---|
| 12 | 7.79 | 7.74 | 7.74 | 7.74 | 7.74 | 7.74 | 7.74 |
| 13 | 3.63 | 3.60 | 3.60 | 3.60 | 3.60 | 3.60 | 3.60 |
| 18 | 21.21 | 21.06 | 21.06 | 21.06 | 21.06 | 21.06 | 21.06 |
| 25 | 18.13 | 18.00 | 18.00 | 18.00 | 18.10 | 18.10 | 18.10 |
| 29 | 18.13 | 18.00 | 18.00 | 18.00 | 18.40 | 18.40 | 18.40 |
| 35 | 12.08 | 12.00 | 12.00 | 12.00 | 8.00 | 8.00 | 8.00 |
| 38 | | | | | 4.00 | | |
| 39 | | | | | | 4.00 | |
| 40 | | | | | | | 4.00 |
| 41 | 0.30 | 1.00 | | | 0.50 | 0.50 | 0.50 |
| 42 | | | | 1.00 | | | |
| 43 | | | 1.00 | | | | |
| 44 | 6.04 | 6.00 | 6.00 | 6.00 | 6.00 | 6.00 | 6.00 |
| Solvent from raw materials | 12.69 | 12.60 | 12.60 | 12.60 | 12.60 | 12.60 | 12.60 |
| Total | 100.00 | 100.00 | 100.00 | 100.00 | 100.00 | 100.00 | 100.00 |

TABLE 11

| | Formulation data | | | | | | |
|---|---|---|---|---|---|---|---|
| | 19 | 20 | 21 | 22 | 23 | 24 | 25 |
| Solids content | 51.05 | 51.40 | 51.40 | 51.40 | 50.90 | 50.90 | 50.90 |
| P/B ratio | 0.56 | 0.59 | 0.59 | 0.59 | 0.57 | 0.57 | 0.57 |
| Binder content, solid | 32.63 | 32.40 | 32.40 | 32.40 | 32.40 | 32.40 | 32.40 |
| Anticorrosive pigment | 12.08 | 12.00 | 12.00 | 12.00 | 12.00 | 12.00 | 12.00 |
| Pigment content | 18.42 | 19.00 | 19.00 | 19.00 | 18.50 | 18.50 | 18.50 |
| Solvent | 48.95 | 48.60 | 48.60 | 48.60 | 49.10 | 49.10 | 49.10 |

TABLE 12

| Characteristics | 19 | 20 | 21 | 22 | 23 | 24 | 25 |
|---|---|---|---|---|---|---|---|
| PMT (° C.) | 160 | 154 | 160 | 154 | 150 | 150 | 150 |
| Pot life | 12-20 | 12-20 | 12-20 | 12-20 | 15-24 h | 15-24 h | 15-24 h |
| T-bend | 0 | 0 | 0 | 0 | 1 | — | — |
| Reverse impact | — | — | — | — | 0 | — | — |
| MEK | 8 | 5 | 6 | 6 | 3 | — | — |
| Alkali resistance | — | — | — | — | — | — | — |
| Corrosion protection | <1000 | <1000 | <1000 | <1000 | <1000 | <700 | <700 |

The following meanings apply for Table 1 to Table 12:

TABLE 13

| Component no. | Description |
|---|---|
| 1 | Modified epoxy resin, 60% dispersion in solvent mixture |
| 2 | Solid epoxy resin 1 |
| 3 | Modified epoxy resin, 50% dispersion in solvent mixture |
| 4 | Aromatic, self-crosslinking MDI-based urethane resin, 70% in solvent |
| 5 | Polyurethane resin solution, 60% in solvent |
| 6 | Solid epoxy resin 2 |
| 7 | Methylated melamine/formaldehyde crosslinking agent, 90% in solvent |
| 8 | HDI-based blocked aliphatic polyisocyanate, 75% in solvent |
| 9 | HDI-based blocked aliphatic polyisocyanate, 70% in solvent |
| 10 | HDI/IPDI-based aliphatic urethane resin, 75% in solvent mixture |
| 11 | TDI/HMDI-based aromatic/aliphatic polyisocyanate, 60% in solvent |
| 12 | Aliphatic polyisocyanate (HDI trimer), 90% in solvent mixture |
| 13 | Aliphatic polyisocyanate (HDI trimer), 90% in solvent |
| 14 | Aliphatic polyisocyanate (HDI biuret), 75% in solvent |
| 15 | Branched polyester containing hydroxyl groups |
| 16 | Slightly branched polyester containing hydroxyl groups |
| 17 | Polyacrylate containing hydroxyl groups, 70% in solvent |

TABLE 13-continued

| Component no. | Description |
|---|---|
| 18 | Polyacrylate containing hydroxyl groups, 65% in solvent mixture |
| 19 | Solid epoxy resin 3 |
| 20 | Aliphatic polyisocyanate based on HDI trimer |
| 21 | Saturated, low viscosity polyester resin |
| 22 | Free acid of a complex alkyl phosphate ester, 66% in solvent |
| 23 | Cyclohexanone |
| 24 | Diacetone alcohol |
| 25 | Diethylene glycol monobutyl ether acetate |
| 26 | Diethylene glycol |
| 27 | Propylene glycol methyl ether |
| 28 | Propylene glycol n-butyl ether |
| 29 | Methoxypropyl acetate |
| 30 | Mixture of 55-65% glutaric acid dimethyl ester, 15-25% succinic acid dimethyl ester and 10-25% adipic acid dimethyl ester |
| 31 | Nanoscale MgO pigment |
| 32 | MgO pigment |
| 33 | Anticorrosive pigment 2 |
| 34 | Anticorrosive pigment 3 |
| 35 | Calcium silicate-based anticorrosive pigment 1 |
| 36 | Calcium silicate-based anticorrosive pigment 2 |
| 37 | Organic corrosion inhibitor based on (benzothiazol-2yl-thio)succinic acid |
| 38 | Hydrophobic barrier pigment |
| 39 | Anticorrosive pigment: fine-grained barium sulfate |
| 40 | Anticorrosive pigment: very fine-grained barium sulfate |
| 41 | Silicic acid |
| 42 | Silicic acid |
| 43 | Hydrophobized silicic acid (110 m$^2$/g) |
| 44 | Conductive pigment 1: graphite |
| 45 | Conductive pigment 2: natural colloidal graphite |
| 46 | Conductive pigment 3: molybdenum sulfide |
| 47 | Antisettling agent (50% solution of an electroneutral salt of a polycarboxylic acid with amines) |
| 48 | Antisettling agent: solution of modified urea |
| 49 | Tannin-containing wetting agent, 22% in solvent |
| 50 | Barium dinonylnaphthalene sulfonate, 50% in solvent |

Further examples are shown in Tables 14-19, (component numbers are listed in Table 20 hereinafter).

TABLE 14

| Comp. No. | Ex. 26 | Ex. 27 | Ex. 28 | Ex. 29 | Ex. 30 | Ex. 31 | Ex. 32 | Ex. 33 | Ex. 34 | Ex. 35 |
|---|---|---|---|---|---|---|---|---|---|---|
| 12 | 3.60 | 3.60 | 3.60 | 3.60 | 3.56 | 3.58 | 3.60 | 3.60 | 3.60 | 3.83 |
| 13 | 7.74 | 7.74 | 7.74 | 7.74 | 7.66 | 7.70 | 7.74 | 7.74 | 7.74 | 8.23 |
| 18 | 21.06 | 21.06 | 21.06 | 21.06 | 20.85 | 20.96 | 21.06 | 21.06 | 21.06 | 22.40 |
| 22 | | | | | 0.65 | 0.33 | 0.33 | 0.33 | 0.33 | 0.35 |
| 23 | | | | | | | | | 35.60 | |
| 24 | | | | | | | | 35.60 | | |
| 25 | 18.00 | 18.25 | 18.12 | 18.05 | 17.88 | 17.97 | | | | 18.94 |
| 29 | 18.00 | 18.25 | 18.13 | 18.05 | 17.89 | 17.97 | | | | |
| 30 | | | | | | | 35.60 | | | 18.94 |
| 31 | 12.00 | 12.00 | 12.00 | 12.00 | 11.88 | 11.94 | 12.00 | 12.00 | 12.00 | 6.38 |
| 38 | | | 0.25 | 0.30 | 0.30 | 0.30 | 0.30 | 0.30 | 0.30 | 0.32 |
| 39 | 1 | 0.50 | 0.50 | 0.60 | 0.60 | 0.60 | 0.60 | 0.60 | 0.60 | 0.64 |
| 41 | 6.00 | 6.00 | 6.00 | 6.00 | 5.94 | 5.94 | 6.00 | 6.00 | 6.00 | 6.38 |
| Solvent from raw materials | 12.60 | 12.60 | 12.60 | 12.60 | 12.79 | 12.71 | 12.77 | 12.77 | 12.77 | 13.59 |
| Total | 100.00 | 100.00 | 100.00 | 100.00 | 100.00 | 100.00 | 100.00 | 100.00 | 100.00 | 100.00 |

TABLE 15

| | Formulation data | | | | | | | | | |
|---|---|---|---|---|---|---|---|---|---|---|
| | 26 | 27 | 28 | 29 | 30 | 31 | 32 | 33 | 34 | 35 |
| Solids content | 51.40 | 50.90 | 51.15 | 51.30 | 51.44 | 51.35 | 51.63 | 51.63 | 51.63 | 48.53 |
| P/B ratio | 0.59 | 0.57 | 0.58 | 0.58 | 0.57 | 0.58 | 0.58 | 0.58 | 0.58 | 0.39 |
| Binder content, solid | 32.40 | 32.40 | 32.40 | 32.40 | 32.72 | 32.57 | 32.73 | 32.73 | 32.73 | 34.81 |
| Anticorrosive pigment | 12.00 | 12.00 | 12.00 | 12.00 | 11.88 | 11.94 | 12.00 | 12.00 | 12.00 | 6.38 |
| Pigment content | 19.00 | 18.50 | 18.75 | 18.90 | 18.72 | 18.78 | 18.90 | 18.90 | 18.90 | 13.72 |
| Solvent | 48.60 | 49.10 | 48.85 | 48.70 | 48.56 | 48.65 | 48.37 | 48.37 | 48.37 | 51.47 |

TABLE 16

| Characteristics | 26 | 27 | 28 | 29 | 30 | 31 | 32 | 33 | 34 | 35 |
|---|---|---|---|---|---|---|---|---|---|---|
| PMT (° C.) | 160 | 160 | 160 | 160 | 160 | 160 | 160 | 160 | 160 | 160 |
| Pot life | >24 h | >24 h | >24 h | >24 h | >24 h | >24 h | 48 h | 24 h | 48 h | >24 h |
| T-bend | 1-2 | | 1-2 | 2 | 2 | 2 | — | — | — | 1-2 |
| Reverse impact | 0-1 | 0-1 | 1-2 | 2 | 1 | 0-1 | — | — | — | 0-1 |

TABLE 16-continued

| Characteristics | 26 | 27 | 28 | 29 | 30 | 31 | 32 | 33 | 34 | 35 |
|---|---|---|---|---|---|---|---|---|---|---|
| MEK | — | — | — | — | — | — | — | — | — | 13 |
| Alkali resistance | — | — | — | 1-2 | 2 | 1-2 | — | — | — | 1-2 |
| Corrosion protection | 1000 | 1000− | 1000 | 1000 | 1000 | 1000 | 1000 | 1000 | 1000+ | 1000 |

TABLE 17

| Comp. No | Ex. 36 | Ex. 37 | Ex. 38 | Ex. 39 | Ex. 40 | Ex. 41 | Ex. 42 | Ex. 43 | Ex. 44 | Ex. 45 |
|---|---|---|---|---|---|---|---|---|---|---|
| 3 | | | | 2.75 | 2.41 | 4.67 | 4.58 | 4.49 | 3.81 | 4.14 |
| 9 | | | | 3.01 | 19.09 | 5.11 | 5.01 | 4.91 | 4.14 | 4.54 |
| 12 | 3.40 | 3.60 | 3.60 | 3.60 | | 3.06 | 3.00 | 2.94 | 2.46 | 2.69 |
| 13 | 7.30 | 7.74 | 7.74 | 7.74 | | 6.57 | 6.44 | 6.32 | 5.28 | 5.77 |
| 18 | 19.87 | 21.06 | 21.06 | 21.06 | 18.43 | 17.89 | 17.54 | 17.20 | 14.38 | 15.66 |
| 22 | 0.31 | 0.33 | 0.33 | 0.33 | 0.29 | 0.29 | 0.28 | 0.28 | 0.27 | 0.28 |
| 24 | | | | 22.00 | 19.25 | 11.30 | 21.57 | 21.15 | 26.74 | 24.69 |
| 25 | 16.80 | 17.80 | 17.80 | | | | | | | |
| 29 | 16.80 | 17.80 | 17.80 | | | | | | | |
| 30 | | | | | | 10.70 | | | 8.60 | 6.49 |
| 31 | 16.98 | 6.00 | 6.00 | 15.00 | 13.13 | 15.00 | 14.71 | 14.42 | 11.99 | 14.69 |
| 32 | | 6.00 | 6.00 | | | | | | | |
| 38 | 0.28 | 0.30 | 0.30 | | | | | | | |
| 39 | 0.57 | 0.60 | 0.60 | 0.70 | 0.61 | 0.70 | 0.69 | 0.67 | 0.57 | 0.60 |
| 41 | 5.66 | 6.00 | 6.00 | 7.00 | 6.13 | 7.00 | 6.86 | 6.73 | 5.66 | 6.15 |
| 46 | | | | | | | | 0.86 | | |
| 47 | | | | | | | 0.98 | | 0.90 | |
| Solvent from raw materials | 12.03 | 12.77 | 12.77 | 16.81 | 20.66 | 17.71 | 18.34 | 20.03 | 15.20 | 14.30 |
| Total | 100.00 | 100.00 | 100.00 | 100.00 | 100.00 | 100.00 | 100.00 | 100.00 | 100.00 | 100.00 |

TABLE 18

| | Formulation data | | | | | | | | | |
|---|---|---|---|---|---|---|---|---|---|---|
| | 36 | 37 | 38 | 39 | 40 | 41 | 42 | 43 | 44 | 45 |
| Solids content | 54.37 | 51.63 | 51.63 | 61.19 | 60.09 | 60.29 | 60.09 | 58.82 | 49.46 | 54.52 |
| P/B ratio | 0.76 | 0.58 | 0.58 | 0.59 | 0.49 | 0.60 | 0.59 | 0.59 | 0.58 | 0.65 |
| Binder content, solid | 30.88 | 32.73 | 32.73 | 38.49 | 40.22 | 37.59 | 37.83 | 37.00 | 31.24 | 33.08 |
| Anticorrosive pigment | 16.98 | 12.00 | 12.00 | 15.00 | 13.13 | 15.00 | 14.71 | 14.42 | 11.99 | 14.69 |
| Pigment content | 23.49 | 18.90 | 18.90 | 22.70 | 19.87 | 22.70 | 22.26 | 21.82 | 18.22 | 21.44 |
| Solvent | 45.63 | 48.37 | 48.37 | 38.81 | 39.91 | 39.71 | 39.91 | 41.18 | 50.54 | 45.48 |

TABLE 19

| Characteristics | 36 | 37 | 38 | 39 | 40 | 41 | 42 | 43 | 44 | 45 |
|---|---|---|---|---|---|---|---|---|---|---|
| PMT (° C.) | 150 | 160 | 160 | 160 | 160 | 160 | 160 | 160 | 160 | 160 |
| Pot life | approx. 48 h | approx. 48 h | approx. 48 h | approx. 48 h | >4 weeks | approx. 36 h | approx. 48 h | approx. 48 h | approx. 48 h | approx. 48 h |
| T-bend | 1 | 2 | 2-3 | 1 | 2 | 1-2 | 2-3 | 1 | 1-2 | 1 |
| Reverse impact | 2-3 | 0-1 | 1-2 | 1-2 | 3 | 1-2 | 3 | 1 | 2 | 1 |
| MEK | 1 | 12 | 19 | 10 | 10 | 11 | 8 | 9 | 9 | 5 |
| Alkali resistance | 0 | 0-1 | 2 | 1-2 | 1 | 1-2 | 2-3 | 2 | 2 | 1-2 |
| Corrosion protection | 1000 | 1000 | 1000 | 1000 | 1000 | 1000 | 1000++ | 1000 | 1000 | 1000 |

The following meanings apply for Table 14 to Table 19:

TABLE 20

| Component No. | Description |
|---|---|
| 1 | Modified epoxy resin, 60% dispersion in solvent mixture |
| 2 | Solid epoxy resin 1 |
| 3 | Modified epoxy resin, 50% dispersion in solvent mixture |
| 4 | Aromatic, self-crosslinking MDI-based urethane resin, 70% in solvent |
| 5 | Polyurethane resin solution, 60% in solvent |
| 6 | Solid epoxy resin 2 |
| 7 | Methylated melamine/formaldehyde crosslinking agent, 90% in solvent |
| 8 | HDI-based blocked aliphatic polyisocyanate, 75% in solvent |
| 9 | HDI-based blocked aliphatic polyisocyanate, 70% in solvent |
| 10 | HDI/IPDI-based aliphatic urethane resin, 75% in solvent mixture |
| 11 | TDI/HMDI-based aromatic/aliphatic polyisocyanate, 60% in solvent |
| 12 | Aliphatic polyisocyanate (HDI trimer), 90% in solvent mixture |
| 13 | Aliphatic polyisocyanate (HDI trimer), 90% in solvent |
| 14 | Aliphatic polyisocyanate (HDI biuret), 75% in solvent |
| 15 | Branched polyester containing hydroxyl groups |
| 16 | Slightly branched polyester containing hydroxyl groups |
| 17 | Polyacrylate containing hydroxyl groups, 70% in solvent |
| 18 | Polyacrylate containing hydroxyl groups, 65% in solvent mixture |
| 19 | Solid epoxy resin 3 |
| 20 | Aliphatic polyisocyanate based on HDI trimer |
| 21 | Saturated, low viscosity polyester resin |
| 22 | Free acid of a complex alkyl phosphate ester, 66% in solvent |
| 23 | Cyclohexanone |
| 24 | Diacetone alcohol |
| 25 | Diethylene glycol monobutyl ether acetate |
| 26 | Diethylene glycol |
| 27 | Propylene glycol methyl ether |
| 28 | Propylene glycol n-butyl ether |
| 29 | Methoxypropyl acetate |
| 30 | Mixture of 55-65% glutaric acid dimethyl ester, 15-25% succinic acid dimethyl ester and 10-25% adipic acid dimethyl ester |
| 31 | Anticorrosive pigment based on calcium silicate |
| 32 | Nanoscale MgO pigment |
| 33 | MgO pigment |
| 34 | Anticorrosive pigment 2 |
| 35 | Anticorrosive pigment 3 |
| 36 | Anticorrosive pigment: fine-grained barium sulfate |
| 37 | Anticorrosive pigment: very fine-grained barium sulfate |
| 38 | Silicic acid |
| 39 | Silicic acid |
| 40 | Hydrophobized silicic acid (110 m$^2$/g) |
| 41 | Conductive pigment 1: graphite |
| 42 | Conductive pigment 2: natural colloidal graphite |
| 43 | Conductive pigment 3: molybdenum sulfide |
| 44 | Antisettling agent (50% solution of an electroneutral salt of a polycarboxylic acid with amines) |
| 45 | Antisettling agent: solution of modified urea |
| 46 | Tannin-containing wetting agent, 22% in solvent |
| 47 | Barium dinonylnaphthalene sulfonate, 50% in solvent |

The invention claimed is:

1. A metal sheet or a metal component, comprising:
a multilayer coating system on at least one surface of a metal sheet or metal component, said multilayer system comprising at least:
a) a conversion layer deposited on the metal sheet or metal component, said conversion layer containing no more than 1 mg of chromium per m$^2$;
b) a layer of a crosslinked organic polymer system deposited on the conversion layer, said layer of a crosslinked organic polymer system having a thickness in a range from 0.5 to 2.5 μm, and comprising, relative to total mass of said layer of a crosslinked organic polymer system:
1) 2 to 25 wt. % of an electrically conductive pigment having a relative density of at most 3 g/cm$^3$; and
2) no more than 5 wt. % of an electrically conductive pigment having a relative density of more than 3 g/m$^3$;
wherein said metal sheet or metal component bearing said multilayer system, without an additional application of oil, exhibits a coefficient of friction "μ" of below 0.1 in tribometer friction wear tests at a contact pressure in a range from 300 to 700 daN.

2. The metal sheet or metal component as claimed in claim 1, wherein the metal sheet or metal component comprises metal selected from aluminum, an aluminum alloy, zinc, a zinc alloy, steel, and steel coated with one of zinc, aluminum or alloys of zinc or aluminum.

3. The metal sheet or metal component as claimed in claim 1, wherein the conversion layer a) is formed by treatment with a layer-forming phosphating conversion solution, a non-layer-forming phosphating conversion solution or an aqueous solution of complex fluorides of B, Si, Ti, Zr and/or Hf.

4. The metal sheet or metal component as claimed in claim 1, wherein the layer b) comprises a polymer system based on a urethane resin as the crosslinked organic polymer system.

5. The metal sheet or metal component as claimed in claim 4, wherein the urethane resin is obtained by reacting an aliphatic polyisocyanate with at least one of polyesters containing hydroxyl groups, polyethers containing hydroxyl groups or poly(meth)acrylates containing hydroxyl groups.

6. The metal sheet or metal component as claimed in claim 1, wherein the layer b) comprises a polymer system based on an epoxy resin as the crosslinked organic polymer system.

7. The metal sheet or metal component as claimed in claim 6, wherein the epoxy resin is obtained by reacting a polyepoxide having residual epoxy groups with one or more curing agents selected from the group consisting of melamine/formaldehyde resins, polyesters containing hydroxyl groups, polyethers containing hydroxyl groups, and poly(meth)acrylates containing hydroxyl groups.

8. The metal sheet or metal component as claimed in claim 1, wherein the layer b) comprises both a polymer system based on a urethane resin and a polymer system based on an epoxy resin as the crosslinked organic polymer system.

9. The metal sheet or metal component as claimed in claim 8, wherein the urethane resin is obtained by reacting a polyisocyanate with polyesters containing hydroxyl groups, polyethers containing hydroxyl groups or poly(meth)acrylates containing hydroxyl groups and wherein the epoxy resin is obtained by reacting a polyepoxide with one or more curing agents selected from the group consisting of melamine/formaldehyde resins, polyesters containing hydroxyl groups, polyethers containing hydroxyl groups, and poly(meth)acrylates containing hydroxyl groups.

10. The metal sheet or metal component as claimed in claim 1, wherein the layer b) comprises a polymer system which constitutes a reaction product of an epoxy resin present as a polyether containing hydroxyl groups based on a bisphenol/epichlorohydrin polycondensation product with an aliphatic polyisocyanate.

11. The metal sheet or metal component as claimed in claim 10, wherein the layer b) additionally comprises a urethane resin, obtained by reacting a polyisocyanate with polyesters containing hydroxyl groups or poly(meth)acrylates containing hydroxyl groups.

12. The metal sheet or metal component as claimed in claim 1, wherein the layer b) comprises graphite and/or carbon black as the electrically conductive pigment 1) and/or the electrically conductive pigment 2).

13. The metal sheet or metal component as claimed in claim 1, wherein the layer b) additionally comprises one or more components selected from:
I. corrosion inhibitors and/or anticorrosive pigments in an amount of from 10 to 40 wt. %, II. silicic acids or silicon oxides in an amount of from 1 to 3 wt. %, III. lubricants or forming aids in an amount of from 1 to 10 wt. %, said amounts being relative to total mass of the layer b).

14. The metal sheet or metal component as claimed in claim 1, wherein the layer b) exhibits a Moh hardness of no more than 4.

15. A method of producing a metal sheet or metal component as claimed in claim 1, comprising:
   i) optionally cleaning an uncoated metal sheet or metal component;
   ii) contacting the uncoated metal sheet or metal component with a conversion solution, thereby producing the conversion layer a), and thereafter, with or without intermediate rinsing,
   iii) contacting the conversion layer a) with a liquid treatment agent, which, after curing at a substrate temperature in the range from 120 to 260° C., produces the layer b).

16. The method as claimed in claim 15, wherein the liquid treatment agent in step iii) comprises at least one polyisocyanate and at least one reaction component selected from polyesters containing hydroxyl groups, polyethers containing hydroxyl groups and poly(meth)acrylates containing hydroxyl groups.

17. The method as claimed in claim 15, wherein the liquid treatment agent in step iii) comprises at least one polyepoxide having residual epoxy groups and one or more curing agents selected from the group consisting of melamine/formaldehyde resins, polyesters containing hydroxyl groups, polyethers containing hydroxyl groups, and poly(meth)acrylates containing hydroxyl groups.

18. The method as claimed in claim 15, wherein the liquid treatment agent in step iii) comprises at least one crosslinkable resin component selected from:
   A) non-blocked aliphatic polyisocyanate,
   B) blocked aliphatic polyisocyanate,
   C) epoxy resin present as a polyether containing hydroxyl groups, based on a bisphenol/epichlorohydrin polycondensation product, and
   D) at least one reaction component selected from polyesters containing hydroxyl groups and poly(meth)acrylates containing hydroxyl groups.

19. The method as claimed in claim 15, wherein the liquid treatment agent in step iii) comprises, relative to total mass of the liquid treatment agent:
   4 to 8 wt. % of an electrically conductive pigment having a relative density of at most 3 $g/cm^3$, and
   no more than 3 wt. % of an electrically conductive pigment having a relative density of more than 3 $g/m^3$.

20. The method as claimed in claim 15, wherein the liquid treatment agent in step iii) additionally comprises, relative to total mass of the liquid treatment agent, one or more components selected from
   I. corrosion inhibitors and/or anticorrosive pigments in an amount of from 5 to 20 wt. %,
   II. silicic acids or silicon oxides in an amount of from 0.5 to 1.5 wt. %, and
   III. lubricants or forming aids in an amount of from 1 to 10 wt. %.

21. The method as claimed in claim 15, wherein the liquid treatment agent in step iii) comprises, relative to the total mass of the liquid treatment agent:
   35 to 55 wt. % of organic solvent and
   20 to 45 wt. % of resin components.

22. A method of producing shaped components made from metal sheet, comprising:
   performing a forming operation on the metal sheet as claimed in claim 1, without application of oil onto said metal sheet, thereby creating a formed sheet; and
   joining the formed sheet with other metal sheets by arc welding.

* * * * *